United States Patent
Heyde

(10) Patent No.: US 6,241,377 B1
(45) Date of Patent: Jun. 5, 2001

(54) APPARATUS FOR CONTINUOUSLY TEMPERING CHOCOLATE MASSES AND THE LIKE

(75) Inventor: Hans Heyde, Wallenhorst (DE)

(73) Assignee: Sollich GmbH & Co., KG, Bad Salzuflen (DE)

( * ) Notice: Subject to any disclaimer, the term of this patent is extended or adjusted under 35 U.S.C. 154(b) by 0 days.

(21) Appl. No.: 09/436,856

(22) Filed: Nov. 9, 1999

(30) Foreign Application Priority Data

Nov. 24, 1998 (DE) .............................................. 198 54 204

(51) Int. Cl.$^7$ ...................................................... B01F 15/06
(52) U.S. Cl. ......................... 366/147; 366/149; 366/316; 366/317
(58) Field of Search ................................... 366/147, 149, 366/316, 317

(56) References Cited

U.S. PATENT DOCUMENTS

| | | | |
|---|---|---|---|
| 2,677,942 | * | 5/1954 | Schott et al. |
| 3,770,252 | | 11/1973 | Gordini et al. ...................... 259/107 |
| 3,845,938 | * | 11/1974 | Schold ................................ 366/144 |
| 4,231,666 | * | 11/1980 | Baron ................................. 366/304 |
| 4,279,295 | | 7/1981 | Duckworth ............................ 165/94 |
| 4,648,315 | | 3/1987 | Blum ...................................... 99/455 |
| 4,859,483 | | 8/1989 | Sollich ................................ 426/519 |
| 4,892,033 | * | 1/1990 | Sollich .................................. 99/455 |

FOREIGN PATENT DOCUMENTS

| | | | |
|---|---|---|---|
| 644312 | 1/1947 | (DK) | ........................................ 32/64 |
| 0 289 849 A2 | 4/1988 | (EP) | . |
| 0 806 149 A2 | 5/1997 | (EP) | . |
| WO 85/03996 | 9/1985 | (WO) | ................................ F25C/1/14 |
| WO 92/00015 | 1/1992 | (WO) | ................................ A23G/1/18 |
| WO 97/25579 | * 7/1997 | (WO) | . |
| WO 97/25578 | 7/1997 | (WO) | ................................ F28G/3/10 |

* cited by examiner

Primary Examiner—W. L. Walker
Assistant Examiner—Michael A. Fleming
(74) Attorney, Agent, or Firm—Thomas, Kayden, Horstemeyer & Risley LLP

(57) ABSTRACT

An apparatus for continuously tempering chocolate masses and the like includes a plurality of tempering chambers (17) including tempering surfaces (18) and being interconnected for the flow of a tempering medium. A plurality of mass chambers (7) is interconnected for the flow of the mass to be tempered, each of the mass chambers (7) being arranged between the tempering surfaces (18) of the tempering chambers (17). A plurality of driven mixing discs (6) has a radius, a circumference, an outer diameter, an inner diameter, a top side (10) and a bottom side (11). The mixing discs (6) are arranged inside the mass chambers (7), and they include openings (22) allowing for a passage of the mass to be tempered from the bottom side (11) toward the top side (10). A majority of mixing blades (12) is arranged at the top sides (10) and at the bottom sides (11) of the mixing discs (6) without continuous channels being formed between the mixing blades (12). The mixing blades (12) have a length which is less than the radius of the mixing discs (6), and the mixing blades (12) are designed and arranged to take the mass to be tempered off the tempering surfaces (18) and to mix the mass.

15 Claims, 8 Drawing Sheets

APPARATUS FOR CONTINUOUSLY TEMPERING CHOCOLATE MASSES AND THE LIKE

CROSS REFERENCE TO RELATED APPLICATIONS

This application claims the benefit of co-pending German patent application number 198 54 204.6 entitled "Vorrichtung zum kontinuierlichen Temperieren von zu verarbeitenden kakaobutterhaltigen oder ähnlichen fetthaltigen Massen", filed on Nov. 24, 1998.

FIELD OF THE INVENTION

The present invention generally relates to generally relates to an apparatus for continuously tempering chocolate masses and the like. Such an apparatus includes a plurality of tempering chambers and a plurality of mass chambers, each of the mass chambers being arranged between the tempering surfaces of the tempering chambers. The mass chambers are interconnected for the flow of the mass to be tempered. More particularly, the present invention relates to an apparatus for continuously tempering chocolate masses and the like including a plurality of driven mixing discs being arranged inside the mass chambers. A majority of mixing blades is arranged at the top sides and at the bottom sides of the mixing discs.

BACKGROUND OF THE INVENTION

The present invention is applicable to all mass chambers no matter whether the mass chamber is part of a cooling zone, a cooling level, a crystallization zone, a crystallization level, a reheat zone, a reheat level or the like. The tempering medium may either be a cooling medium or a heating medium. Usually, the tempering medium is water. Nevertheless, the cooling medium may also be a medium different from water. The present invention is applicable no matter whether the tempering chambers adjacent to the mass chamber are connected to one and the same, or to different tempering circuits.

An apparatus for continuously tempering chocolate masses and the like is known from U.S. Pat. No. 4,648,315. The apparatus includes a tempering column including flat elements being arranged one above the other. A tempering chamber through which a tempering medium flows and a mass chamber through which the mass to be tempered flows are alternatingly arranged in the tempering column. The chambers are designed as disc-like hollow bodies. The tempering chambers are connected to tempering circuits. The mass chambers are interconnected for the flow of the mass from one mass chamber to the next mass chamber. The mass exits a first mass chamber and it enters the adjacent mass chamber in the region of the inner circumference of a driving shaft extending along the axis of the tempering column. Each mass chamber includes two disc-like bodies being driven by the driving shaft. At their outer circumference, the two disc-like bodies include openings for the mass to pass from the bottom side of the first disc-like body to the top side of the second disc-like body. The two disc-like bodies include spiral-like stripping ridges being longer than the radius of the disc. The ridges are arranged at a sense of rotation such that they subject the mass to a conveying effect. Two adjacent spiral-like stripping ridges form a channel continuously extending from the outside to the inside of the disc. The mass is conveyed through this channel without having the possibility of getting in contact with mass being located in other channels. The stripping ridges take the mass off the tempering surfaces of the chamber without getting in direct contact to the tempering surfaces. The two disc-like bodies include ridges at their adjacent sides in each mass chamber. The ridges are radially arranged, and they substantially extend from the inside to the outside in a continuous manner to provide a mixing effect to the mass. There is the danger of so-called dead zones of non-moving or stationary mass being formed between the disc-like bodies. Consequently, if these dead zones are built, the mass only flows across the outer sides of the disc-like bodies facing the tempering surfaces. The two discs being arranged inside the mass chambers do not provide a substantial mixing effect to the mass.

It is also known in the art to only use one disc-like body in each mass chamber. The driven disc includes openings at its outer circumference for a passage of the mass from the bottom side of the disc to the top side of the disc. Both surfaces of the disc include spiral-like stripping ridges. Adjacent stripping ridges form a channel providing a conveying action to the mass. The stripping ridges take the mass off the tempering surface to convey the mass from the inside to the outside, and from the outside to the inside, respectively. The mass exits a first mass chamber and enters a second mass chamber in the inner region of the disc, i.e. close to the driving shaft. Due to channels being formed, the stripping ridges provide a substantial conveying action for the mass. There is no substantial mixing of the mass. Thus, different mass particles at different distances with respect to the tempering surfaces have different temperatures. Consequently, there is the danger of the critical temperature at which crystals are formed in a cooling zone or in a crystallization zone being exceeded. When such a mass chamber and a tempering chamber, respectively, is utilized in the region of a cooling zone or of a crystallization zone, there is no guarantee that a sufficient number of steady B-crystals is formed. B-crystals determine the crystallization of the mass to be tempered and the quality of the product to be produced.

Apparatuses for continuously tempering chocolate masses and the like are known from the European Patent Application No. 0 289 849 A2 and the European Patent Application No. 0 806 149 A2. The apparatuses include a tempering column including a majority of chambers forming a cylinder. The chambers are partly connected to a cooling circuit for a cooling medium, and they are partly connected to a heating circuit for a heating medium. A mass chamber through which the mass flows is arranged between two adjacent chambers. The mass chamber is limited by tempering surfaces being formed by the two adjacent chambers. A driven mixing tool is arranged in each of the mass chambers. The mixing tool includes a hub and a number of radially extending arms. The number of arms usually is between 2 and 4. Each arm includes mixing blades at its top side and its bottom side. The mixing blades provide a mixing motion to the mass. The mixing blades also fulfil the function of taking the mass off the tempering surfaces. The mixing blades are arranged to be radially overlapping. The mixing blades may have an elongated, a convex or a concave design. The design and arrangement of the mixing blades is always identical on one side of the arms, while the design and arrangement of the arms may be identical on the other side, or it may just be opposite. The arms may also include openings to have a positive influence on the mixing effect. The mixing blades fulfill the taking off function and the mixing function. The substantial conveying function is provided by a mass pump pumping the mass through the apparatus and from a first mass chamber to a second mass chamber. There may be regions at different locations inside the mass chambers in which the mass particles remain for different periods of time. There is no guarantee that the mass first entering the apparatus also first exits the apparatus. Due to the arrangement of the mixing arms, there is the danger of the mass remaining in the mass chamber in a circular movement, and thus not participating in the streaming motion of the mass through the apparatus. Different temperatures may occur in differently moved portions of the mass. When the connecting points at which the mass passes from one mass chamber to the adjacent mass chamber is always located on the outside, meaning in the region of the outer circumference of the disc-like mass chamber, there is the danger of a so-called short stream of the mass through the apparatus. Regions of the mass chamber being located at a comparatively small radius do not participate in the flowing motion. This is also true when the mass passages between two mass chambers are spaced apart by 180°.

SUMMARY OF THE INVENTION

Briefly described, the present invention provides an apparatus for continuously tempering chocolate masses and the like. The apparatus includes a plurality of tempering chambers including tempering surfaces and being interconnected for the flow of a tempering medium. A plurality of mass chambers is interconnected for the flow of the mass to be tempered, each of the mass chambers being arranged between the tempering surfaces of the tempering chambers. A plurality of driven mixing discs has a radius, a circumference, an outer diameter, an inner diameter, a top side and a bottom side. The mixing discs are arranged inside the mass chambers, and they include openings allowing for a passage of the mass to be tempered from the bottom side toward the top side. A majority of mixing blades is arranged at the top sides and at the bottom sides of the mixing discs without continuous channels being formed between the mixing blades. The mixing blades have a length which is less than the radius of the mixing discs, and the mixing blades are designed and arranged to take the mass to be tempered off the tempering surfaces and to mix the mass.

With this novel design of the apparatus, one single disc is utilized in each mass chamber. The disc separates the respective mass chamber into two chambers. The disc includes openings at its outer or at its inner circumference, the openings allowing for the mass to flow from the bottom side of the disc to the top side of the disc. It is preferred to arrange the mass entrance and the mass exit centrally in the apparatus. Consequently, the connecting points from one mass chamber to the adjacent mass chamber are also arranged in the center of the apparatus, i.e. in a radial inside region. The openings for the mass to pass from one side of the disc to the other side of the disc are preferably arranged in a radial outside position. Nevertheless, it is also possible to realize an inverted arrangement. There may also be other additional openings in the discs. The mass flows through the apparatus in a forced manner. For example, the mass starts flowing from the bottom side of the disc and a first part of the mass chamber being limited by a tempering surface. Then, the mass flows through the other part of the mass chamber. The perfect forced flow of the mass according to the principle first in-first out is realized when the connection points between two adjacent mass chambers are all located either at the inner circumference or at the outer circumference. The conveying effect on the mass in the sense of a forced flow of the mass is provided by the mass pump. A plurality of mixing blades is arranged at one disc in a mass chamber, the disc being substantially continuous over the entire surface. Preferably, the mixing blades are relatively small bodies or elements having a wall-like or a shovel-like design, the extension of which is substantially less than the radius of the disc. The mixing blades are arranged on the top side and on the bottom side of the disc at relatively great distances with respect to one another, so that no substantial channels are formed between the mixing blades. Instead, the mass to be tempered is uniformly deflected and mixed resulting in an intense mixing of the mass. The conveying action provided by the mixing blades is considerably low. The mixing blades may generally have a similar design as it is known from mixing blades being arranged on stirring arms in the prior art. In combination with only one single disc being arranged in each mass chamber, they provide the positive effects of the mass being forced through the apparatus by the pump and an intense mixing of the mass. It is understood that the mixing blades also fulfill the function to take the mass off the tempering surfaces. The mixing blades do not have to be arranged radially with respect to one another as it is the case with the arrangement of mixing blades on arms. Instead, the mixing blades are arranged on the surface of the disc at the top side and at the bottom side in a spaced apart manner. There is a great variety of different possibilities of arranging the mixing blades in the spaced apart manner. It is always desired to arrange the mixing blades in such a way as to attain an intense mixing of the mass while the mass is pumped along the bottom side or the top side of the disc radially from the outside to the inside and from the inside to the outside, respectively. The essential effect of the mixing blades besides the taking off effect is the mixing effect. Nevertheless, it is also possible that the mixing blades provide a little bit of a conveying effect to the mass, no matter whether this conveying action is directed in the direction of the general conveying direction provided by the pump or opposite to that direction.

Two different kinds of mixing blades may be arranged on the top side and on the bottom side of the disc to be spaced apart about the circumference of the disc. The first kind of the mixing blades may subject the mass to a force being directed radially to the outside, and the second kind of the mixing blades may subject the mass to a force being directed radially to the inside. Due to these opposite forces and these opposite designs of the mixing blades, the intense mixing of the mass is increased both in the region of the top side of the disc and in the region of the bottom side of the disc. The arrangement of the mixing blades on the disc may be symmetrically to the plane of the disc. Due to the intense mixing effect in all cross-sections, the mass has a temperature being very constant compared to the prior art. Thus, utilizing the invention in a cooling zone or in a crystallization zone, it is possible a sufficient precrystallization by forming a sufficient number of nucleuses of crystals is attainable. Utilizing the invention in the region of a heating zone, it is also desirable when the different regions of the mass do not substantially differ with respect to their temperature to even out the melting of unstable crystals in such a reheat zone. Additionally, it is advantageous that the apparatus may be operated at higher mass temperatures in the mass chambers than it is known in the prior art without the critical mass temperature being exceeded. This also means that the apparatus works more stable in the partial load operation mode.

The mixing blades may be arranged on the disc as groups being located on circular rings. These circular rings are imaginary regions at a constant radius about the axis of the shaft to drive the discs. For example, it is possible that mixing blades of a first kind are arranged at one and the same radius, and that mixing blades of a second kind are arranged at the adjacent radius. Nevertheless, it is also possible to arrange the mixing blades on each circular ring in a mixed arrangement. The mixing blades may have different shapes, for example, they may have rounded or sharpened wall portions at the edges. They may also have a concave or a convex shape, a flat elliptical shape, or the like. It is especially desirable to arrange the mixing blades on the circular rings to have alternating mixing directions, meaning a mixing force being directed from the inside to the outside and a mixing force being directed from the outside to the inside. In this way, the mass is thoroughly mixed by changing the flowing direction of the mass elements from a first circular ring to a second circular ring.

The mixing blades may be arranged about the circumference of the mixing discs in an overlapping arrangement to completely take the mass to be tempered off the tempering surfaces during one rotation of the mixing disc. The mixing blades may be arranged such that no dead corners or dead zones in which the mass stays for a longer period of time are formed. It makes sense to design the mixing blades as pure mixing blades without having a substantial conveying effect. The forced conveying action of the mass through the mass chamber is substantially effected by the mass pump. A mass pump is always part of an apparatus for continuously tempering chocolate masses and the like.

The mixing blades may be designed to be rectilinear, and they may be arranged at an inclination angle with respect to the circumferential direction of the circular rings. Nevertheless, other designs and arrangements are also possible. The mixing blades do not necessarily have to be arranged to be perpendicular to the top side or the bottom side of the disc, but they may also be designed and arranged to be inclined or curved with respect to the disc.

The mixing blades may be arranged on the circular rings to be equally spaced apart about the circumference of the mixing disc. In this way, it is taken into account that the circumferential velocity is greater at a greater radius. At the same time, the local velocity of the mass at a greater radius is less than the local velocity of the mass at a radius fusher inside. It is also possible to arrange the mixing blades at different distances from the inside to the outside not growing proportional to the growing circumference and the growing radius, respectively. The inclination angles at which the mixing blades are arranged on the top side and on the bottom side of the disc may vary. For example, it is possible that the mixing blades are arranged on the circular rings such that the inclination angle decreases in a radial direction from the inside to the outside. With this arrangement, the varying circumferential velocities are taken into account.

The openings allowing for a passage of the mass to be tempered from the bottom side toward the top side of the disc may be arranged at the outer diameter of the mixing discs to continuously extend about the entire circumference of the discs. With this arrangement, it is ensured that the mass may pass from the bottom side toward the top side of the disc about the entire outer circumference of the disc. In case of such an arrangement of the openings, the passage for the mass from one mass chamber to another mass chamber takes place close to the driving shaft in the region of the inner circumference. On the other hand, when the mass chambers are interconnected at the outer circumference, the openings are arranged at the inner circumference of the disc to let the mass pass from the bottom side to the top side of the disc. Openings being arranged radially inside are not designed to be continuous about the circumference of the disc since the disc is operatively connected to the drive in this region.

Other objects, features and advantages of the present invention will become apparent to one with skill in the art upon examination of the following drawings and the detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 illustrates a vertical sectional view of an apparatus for continuously tempering chocolate masses and the like.

DETAILED DESCRIPTION

Figure 1:
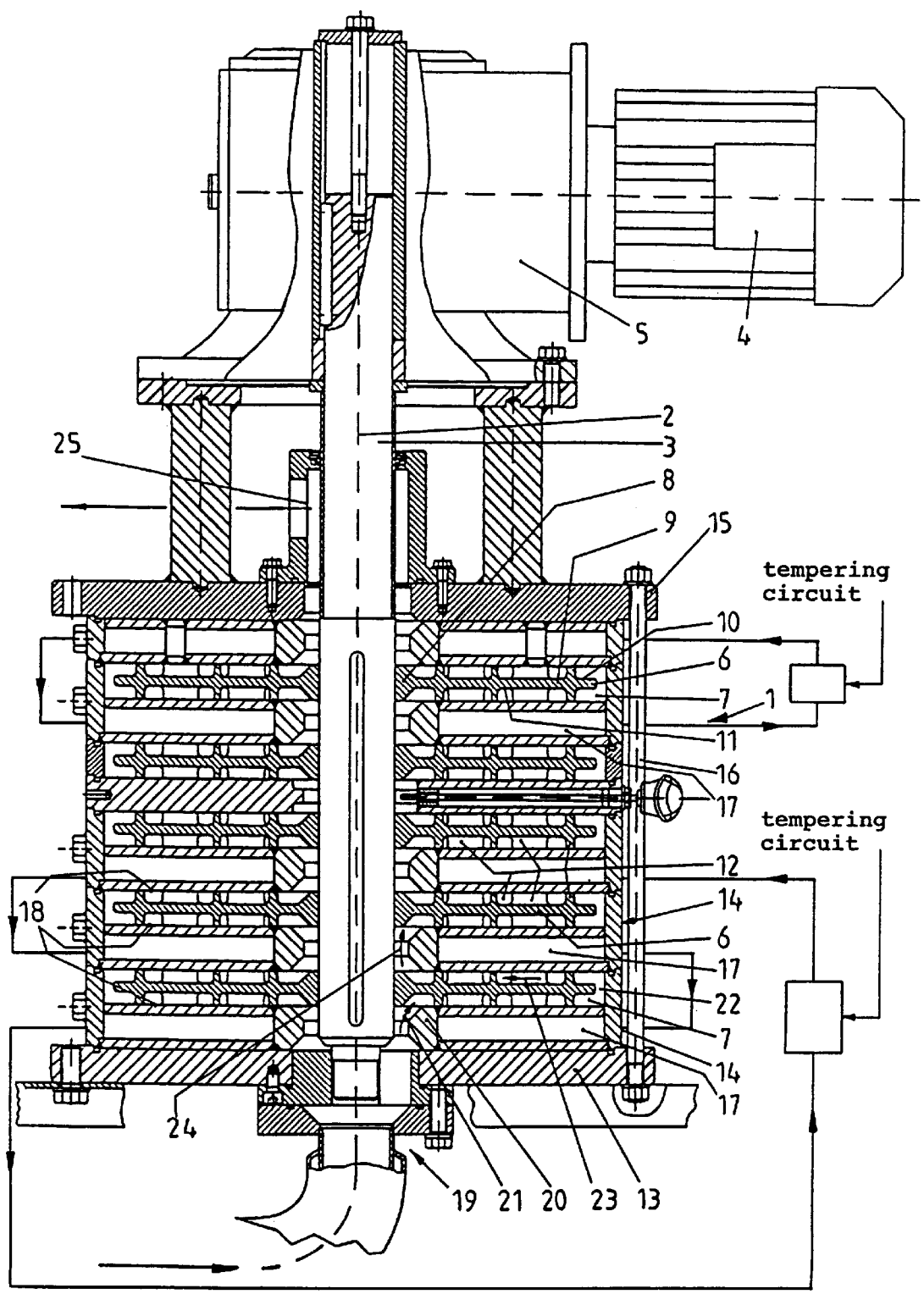

Referring now in greater detail to the drawings, FIG. 1 illustrates a general design and arrangement of one embodiment of the novel apparatus for continuously tempering chocolate masses and the like. A plurality of disc-like elements is arranged to form a tempering column 1. Such an apparatus for continuously tempering chocolate masses and the like is also called a disc tempering machine. The tempering column 1 includes a vertical axis 2. A shaft 3 substantially extends along the entire height of the apparatus. The shaft 3 is designed and arranged to be driven by a motor 4 and a reducing transmission 5 to rotate about the axis 2. Mixing discs 6 are fixedly connected to the shaft 3. The mixing discs 6 rotate inside mass chambers 7. The mixing discs 6 are similar to mixing tools, and they fulfill a stirring and mixing function. Each disc 6 includes a hub 8 being arranged radially inside. The hub 8 is connected to the shaft 3 by a feather key connection to be rotated by the shaft 3. The hub 8 is connected to a body 9 of the disc 6 being substantially flat. The body 9 is substantially flat or plane, it is arranged in the middle of the mass chamber 7 and it has a height which is less than the height of the mass chamber 7. The body 9 of the disc 6 substantially extends along the entire surface. Thus, the body 9 has the shape of an annulus or of a circular ring. The body 9 of the mixing disc 6 has a top side 10 and a bottom side 11. Mixing blades 12 are arranged on the top side 10 and on the bottom side 11 of the disc-like body 9 of the disc 6. The mixing blades 12 are arranged on the top side 10 and on the bottom side 11 in a spaced apart manner in a radial direction and in a circumferential direction, as it will be described in more detail with respect to the following Figures. It can be seen from FIG. 1 that the illustrated embodiment of the apparatus includes five mixing discs 6 being fixedly connected to the shaft 3 and thus being commonly driven. Nevertheless, it is understood that the number of mixing discs 6 may also be more or less than five.

The stationary portion of the apparatus and of the tempering column 1, respectively, also has a disc-like and sectional design, respectively. A number of rings 14 is arranged on a lower cover 13. The rings 14 are arranged one above the other, and they are mounted between the lower cover 13 and an upper cover 15 by screws 16 being arranged about the circumference of the tempering column 1. Each ring 14 includes a tempering chamber 17 through which a tempering medium flows during the operation of the apparatus. Usually, the tempering medium is water. The tempering chambers 17 being arranged one above the other in the direction of the axis 2 may be connected to different tempering circuits. Thus, there may be a cooling zone, a crystallization zone and a reheat zone. The tempering circuits and their connections to the tempering chambers 17 are not illustrated for reasons of clarity. The design and arrangement of the tempering circuits is not of essential importance to the present invention, and it is well known in the art. Each tempering chamber 17 usually includes two tempering surfaces 18. The tempering surfaces 18 are the free surfaces of the mass chambers 7. The mass chambers 7 are chambers through which the mass to be tempered, for example chocolate or white chocolate, flows. Depending on whether the tempering chamber 17 is part of a cooling zone or of a heating zone, the mass flowing through the mass chamber 7 is either cooled or heated. Thus, heat is either passed from the mass to the tempering medium or from the tempering medium to the mass. A mass entrance 19 is arranged in the center of the lower cover 13. The mass entrance 19 extends through the lower cover 13, so that the liquidized chocolate mass is pumped through the mass entrance 19 in an upward direction through the tempering column 1 by a pump (not illustrated). First, the mass is guided through the region of the tempering chamber 17 by a bush 20 surrounding the shaft 3 with a distance. Then, the mass enters the lowest mass chamber 7 according to arrow 21. The mass first enters the portion of the mass chamber 7 being located below the disc-like body 9. The mass cannot flow in an upward direction to the top side 10 of the disc 6, but it is forced to move along the lowest tempering surface 18 between the bottom side 11 of the lowest disc 6 and the lowest surface 18 in a radial direction from the inside to the outside. During this outwardly directed motion, the mass is taken off the lowest tempering surface 18 by the mixing blades 12. The mixing blades 12 also thoroughly mix the mass 12. An opening 22 is arranged in a radial outside portion of the disc 6. The mass flows through the opening 22 in the region of the top side 10 of the lowest disc 6. Thus, the mass enters the portion of the mass chamber 7 being located between the top side 10 of the lowest disc 6 and the tempering surface 18 of the adjacent tempering chamber 17. In this region, the mass is substantially pumped radially from the outside to the inside according to arrow 23. The mixing blades 12 being arranged on the top side 10 of the disc 6 take the mass off the tempering surface 18, and they thoroughly mix the mass. Then, the mass enters the second mass chamber 7 in a radially inside region via the bush 20 according to arrow 24. The above described effects also occur at the second mixing disc 6. The mass moves radially from the inside to the outside below the bottom side 11, and it moves radially from the outside to the inside toward the axis 2 above the top side 10 of the disc 6. This movement is also true for all the following discs 6 and all the following mass chambers 7. Finally, the mass to be tempered exits the apparatus through a centrally arranged mass exit 25. From the mass exit 25, the mass may be, for example, used in a coating machine. It is obvious that in the above described embodiment of the apparatus the mass entrance 19, the bushes 20 and the mass exit 25 are arranged in the center, meaning radially inside. In this arrangement, the bushes 20 form the inner connections for the mass, while the openings 22 being arranged radially outside at the disc 6 enable the mass to flow from the bottom side 11 to the top side 10 of the discs 6. Consequently, the mass flows or streams through the mass chambers 7 in a forced manner. Consequently, no nests or dead zones in which the mass does not move occur. All mass elements uniformly stream through the tempering column 1. Each mass element approximately flows through the tempering column 1 in the same period of time. Thus, the principle first in-first out is fulfilled.

Figure 2:
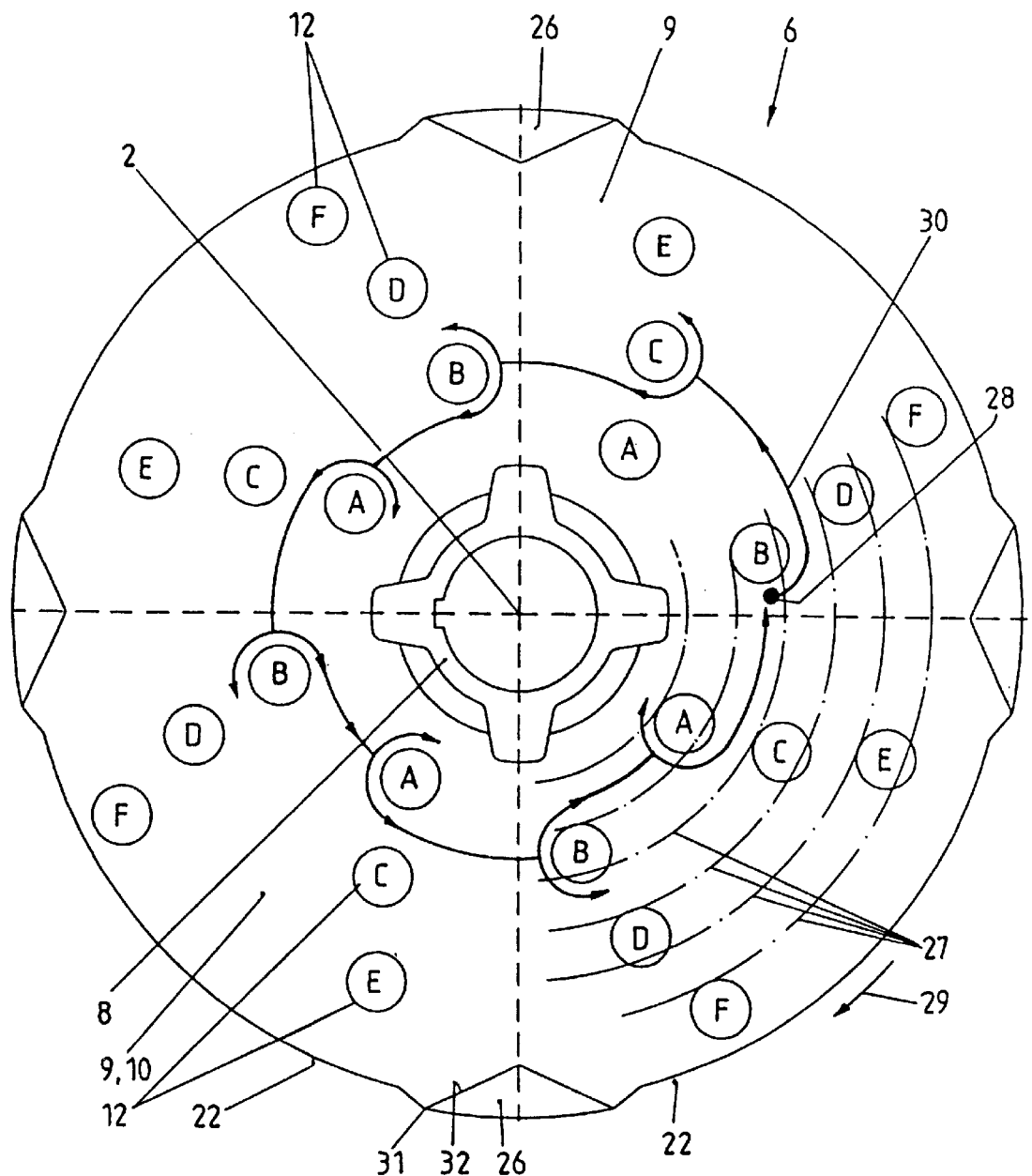
FIG. 2 illustrates a top view of a first embodiment of a mixing disc.

The design of the discs 6 with the mixing blades 12 is of special interest to the invention. FIG. 2 illustrates a top view of a mixing disc 6. The mixing blades 12 are arranged on the top side 10 of the body 9. In the illustrated embodiment, the mixing blades 12 are designed as cylindrical protrusions being arranged in the illustrated manner. FIG. 2 could also illustrate a top view the bottom side 11 of the disc 6. It is imaginable that the mixing blades 12 on the top side 10 and on the bottom side 11 of the disc 6 may be arranged symmetrically to the plane of the body 9. Consequently, the illustrations of the mixing blades being arranged on the top side 10 and on the bottom side 11 are identical. The body 9 of the mixing disc 6 includes a hub 8 in its radial inside portion. The disc-like body 9 with the mixing blades 12 is connected to the hub 8. Four protrusions 26 are arranged at the outer diameter of the disc 6 in a regular arrangement, i.e. they are arranged at an angle of 90°. The disc 6 further includes four openings 22, each of the openings 22 being arranged between two adjacent protrusions 26. The openings 22 serve to let the mass pass from the bottom side 11 toward the top side 10 of the disc 6.

The mixing blades 12 are arranged on the mixing discs 6 in a special way. In a radial inside portion of the disc 6, four mixing blades 12 being designated by the reference letter A are arranged at one and the same radius with respect to the axis 2. The four mixing blades 12 being designated by A are spaced apart by 90°. Moving on in a radial outside direction, there are four mixing blades 12 being designated by the reference letter B. Again, the mixing blades 12 being designated by B are spaced apart by 90°, and they are arranged at one and the same radius. The mixing blades 12 being designated by A and B overlap in a tangential direction. To make is easier to see the overlapping arrangement, circular rings 27 are illustrated by a dash-dot line in a portion of the disc 6. Moving further on in a radial outside direction, groups of mixing blades 12 being designated by C, D, E and F are arranged on the disc 6 in the above described way. It can be seen that the mixing blades 12 always overlap, so that a complete coverage is attained and the tempering surface 18 may be completely scanned by the mixing blades 12. Thus, it is ensured that the mass is taken off each radial position of the tempering surface 18 by the mixing blades 12. The complete taking off effect is the first function of the mixing blades 12. The other function of the mixing blades 12 is to thoroughly mix the mass. To make it easier to understand the functionality of the mixing disc 6 and of the mixing blades 12, a mass element 28 is illustrated to be arranged in front of one of the mixing blades 12 being designated by B. When the mixing disc 6 is driven to rotate in the direction of arrow 29, the mass element 28 is forced by the mixing blade 12 being designated by B toward the outside of the disc 6, as it is indicated by arrow 30. Thus, the mass element 28 is moved radially from the inside toward the outside and into the region of the next circular ring 27, although the general flowing direction on the illustrated top side 10 of the mixing disc 6 is directed radially from the outside to the inside. The general flowing direction is determined by the pump of the apparatus. Although the effect of the pump generally makes the mass elements move radially from the outside to the inside, it is presumed that the mass element 28 keeps on moving on a circular track. Thus, the mass element 28 or an adjacent mass element is taken by the mixing blade 12 being designated by C during the rotation of the mixing disc 6, and it will split according to the arrows of the track of movement 30. This process is repeated at the next mixing blade 12 being designated by B. During further rotation of the disc 6, the mass elements get into the region of the mixing blades 12 being designated by A, B, A, B, A, and so forth. Consequently, the mass is thoroughly mixed. The entire mass between the top surface 10 of the mixing disc 6 and the adjacent stationary tempering surface 18 is thoroughly mixed and stirred. The mixing motion and the stirring motion, respectively, takes place at each of the illustrated mixing blades 12, so that the mass approximately has the same temperature at all places, at least at all places of one and the same radius. As well as the mixing blades 12 mix or stir, the protrusions 26 being arranged at the outside of the radius of the disc 6 also help this motion. The protrusions 26 form stepping edges 31 and deflecting surfaces 32 taking the mass off the annular walls of the rings 14 in the region of the mass chamber 7, and they move the mass radially in an inside direction, so that no dead zones are formed in the mass in this region.

Figure 3:
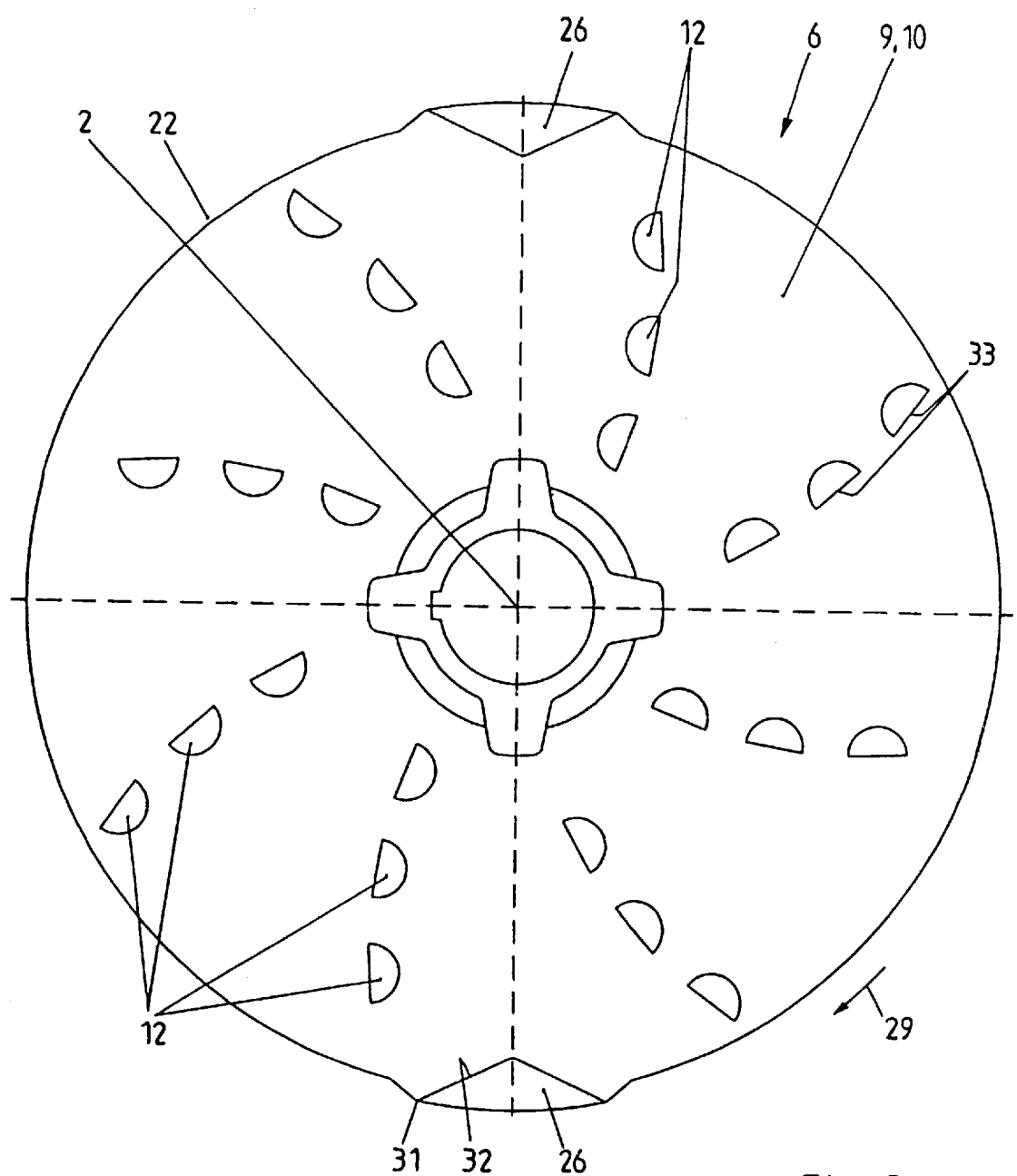
FIG. 3 illustrates a top view of a second embodiment of the mixing disc.

FIG. 3 illustrates a second embodiment of the mixing disc 6. The mixing disc 6 only includes two protrusions 26, and consequently only two openings 22 being arranged at the circumference of the body 9. The mixing blades 12 are designed as semi-cylindrical protrusions on the top side 10 of the disc 6. Correspondingly, mixing blades 12 are arranged on the bottom side 10 of the body 9. Four mixing blades 12 are arranged at the same radius about the circumference of the disc 6, so that a group arrangement similar as described with respect to FIG. 2 is attained. The mixing blades 12 are arranged such that each single mixing blade 12 independently fulfills its mixing finction and its taking off finction. The mixing blades 12 do not form channels between one another. Thus, the mass particles are not isolated from other mass particles. The mixing blades 12 having a semicircle cross section include a plane surface 33 being arranged at different inclination angles from the inside to the outside of the disc 6. These surfaces 33 subject the mass elements to a conveying effect being directed radially from the inside to the outside, i.e. in a direction opposite to the general conveying direction determined by the pump. Since the two components of the movement are combined at the mass elements, the flow time of the mass flowing through the respective mass chamber 7 is comparatively increased.

Figure 4:
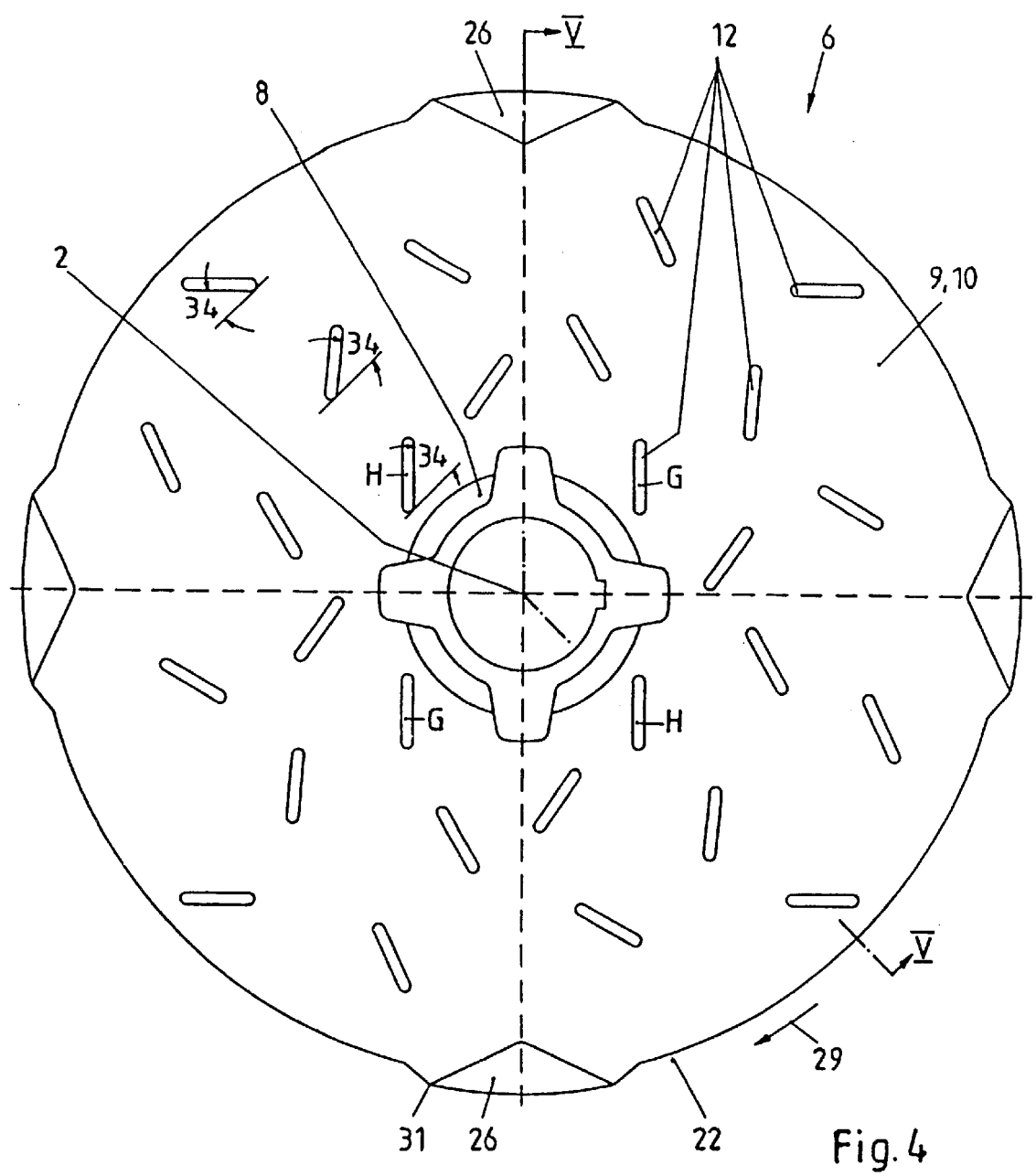
FIG. 4 illustrates a top view of a third embodiment of the mixing disc.
Figure 5:
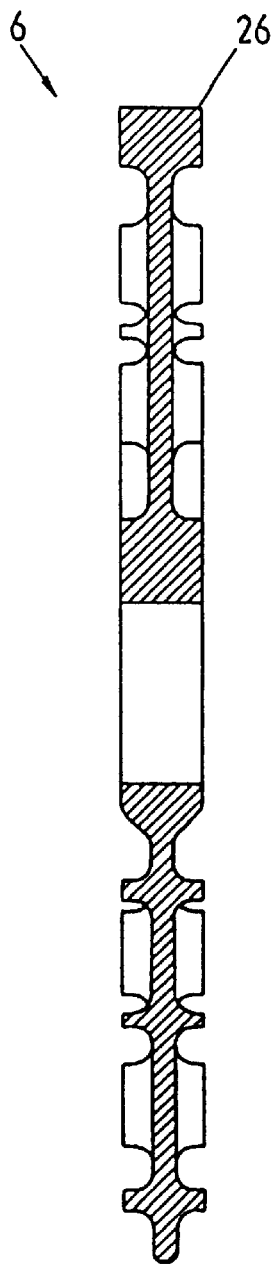
FIG. 5 illustrates a sectional view along line V—V of FIG. 4.

The embodiment of the mixing disc 6 as illustrated in FIGS. 4 and 5 includes mixing blades 12 being arranged radially and spaced apart about the circumference at circular rings 27 (FIG. 2). Again, four mixing blades 12 are arranged at the same radius. The mixing blades 12 according to FIG. 2 have an effect on the mass elements being directed radially to the inside and to the outside, respectively. The effect is evenly distributed. The mixing blades 12 according to FIG. 3 mostly have an effect on the mass elements being directed radially from the inside to the outside. Although the mixing blades 12 according to FIGS. 4 and 5 approximately have the same design, they are arranged such that some of the mixing blades 12 have an effect on the mass element being directed radially from the inside to the outside, whereas other mixing blades 12 have an effect on the mass elements being directed radially from the outside to the inside. Beginning radially inside, two mixing blades 12 being designated by G and two mixing blades 12 being designated by H are arranged at the same radius and on the same circular ring, respectively. During the rotation of the disc 6 according to arrow 29, the mixing blades G have an effect on the mass elements being substantially directed radially from the inside to the outside. Contrary, the mixing blades 12 being designated by H force the mass elements in a radial direction from the outside toward the inside of the disc 6. The same is true for all pairs of four mixing blades 12 being provided radially from the inside to the outside. The total number of mixing blades G and the number of mixing blades H being arranged on the entire top surface 10 of the body 9 is identical. The four mixing blades 12 being arranged at the greatest radius about the axis 2 are spaced apart by 90°, so that the distance between two adjacent mixing blades 12 on one and the same circular ring is relatively great. This distance is increased from the inside to the outside of the disc 6. The mixing blades 12 are arranged to be overlapping, so that the mass is completely taken off the tempering surface 18. The mixing blades 12 are arranged as elongated protrusions having rounded ends. The mixing blades 12 are arranged at the same inclination angle 34 no matter on what radius the mixing blades 12 are provided. It is easily imaginable that it is also possible to utilize different inclination angles 34 on different radii. The arrangement of different inclination angles 34 may be coordinated with the average velocities of the mass varying with respect to the radial position.

Figure 6:
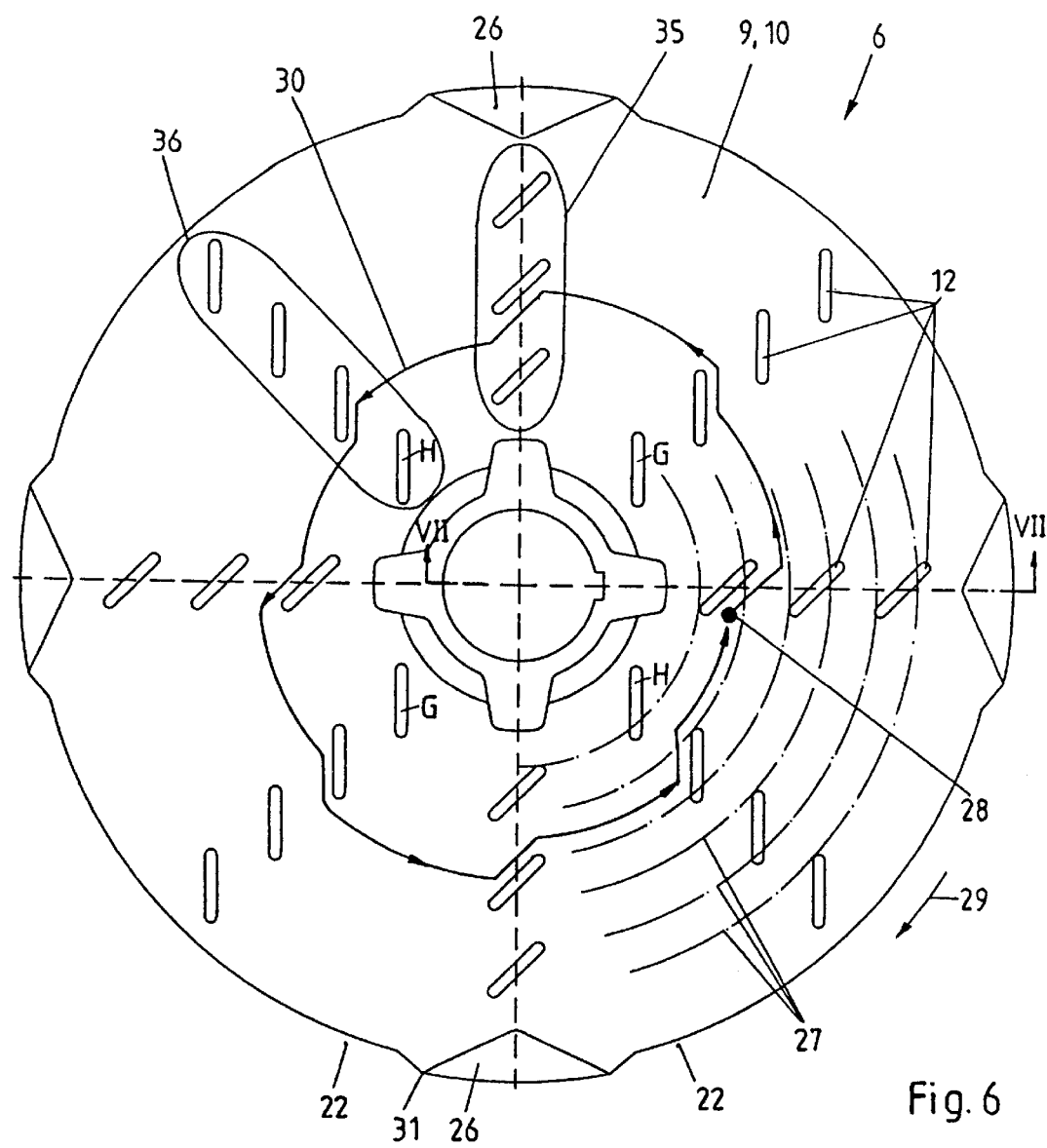
FIG. 6 illustrates a top view of another embodiment of a mixing disc.
Figure 7:
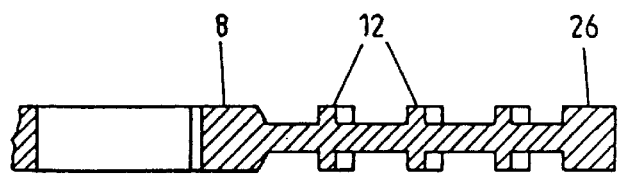
FIG. 7 illustrates a sectional view along line VII—VII of FIG. 6.

FIGS. 6 and 7 illustrate another exemplary embodiment of the disc 6. The mixing blades 12 are arranged in groups of four mixing blades 12 at the same radius and on circular rings 27. The mixing blades 12 being designated by G force the mass elements 28 substantially to the outside of the disc 6. The two other mixing blades 12 being designated by H substantially move the mass elements 28 radially to the inside of the disc 6. The mixing blades 12 are designed and arranged to overlap about the entire surface of the disc 6. An exemplary track of movement 30 as it results from the disc 6 being driven according to arrow 29 is indicated to illustrate the movement of the mass elements 28. The mixing blades 12 are arranged to be in radial alignment from the inside to the outside. The mixing blades 12 have the same inclination angle 34. A first group 35 of three mixing blades 12 substantially moving the mass elements 28 radially from the outside to the inside is provided in the circumferential direction according to arrow 29. A second group 36 consisting of four mixing blades 12 follows to the group 35 when the disc 6 is driven according to arrow 29. The group 36 of mixing blades 12 also forces the mass elements to substantially move in a radial direction from the outside to the inside of the disc 6. Two other groups consisting of three and of four mixing blades 12 follow in the circumferential direction, both forcing the mass elements substantially in a radial direction from the inside to the outside of the disc 6. The mixing blades 12 are correspondingly arranged about the entire circumference of the disc 6. The number of mixing blades 12 giving a component of movement to the mass elements 28 in a radial direction from the outside to the inside is even to the number of mixing blades 12 forcing the mass elements 28 in a radial direction from the inside toward the outside of the disc 6.

Figure 8:
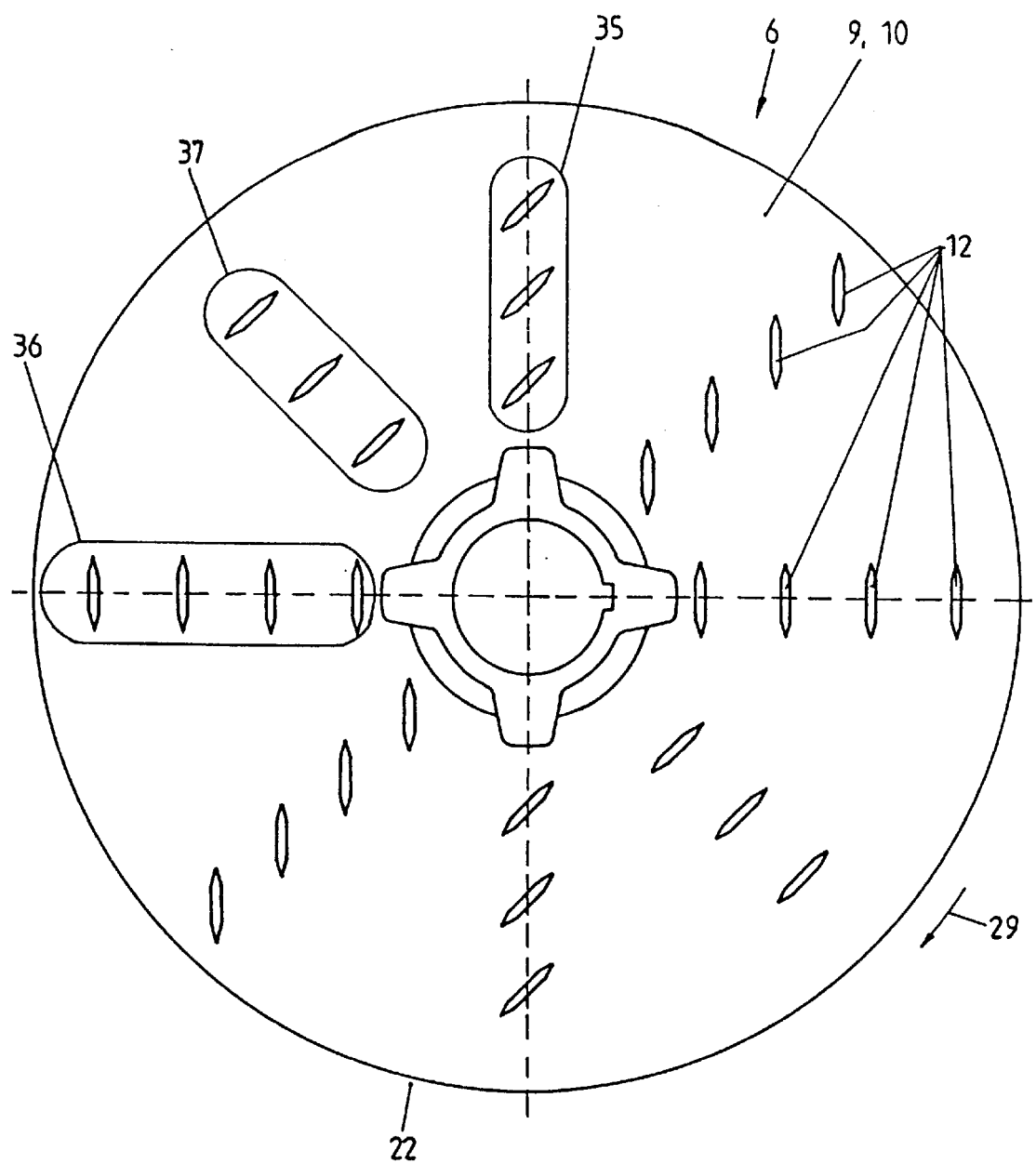
FIG. 8 illustrates a top view of another embodiment of the mixing disc.

The embodiment illustrated in FIG. 8 is similar to the embodiments illustrated in FIGS. 6 and 7. Again, the mixing blades 12 are arranged in a radial direction about the circular rings 27 to be radially aligned. Then, a group 35 is followed by a group 37 being followed by a group 36 and so forth. Between each group 35, 37, 36 the direction of movement of the mass elements changes. The disc 6 and the body 9 does not have protrusions 26, so that one single continuous opening 22 is provided for the mass to flow from the bottom side 11 to the top side 10 of the disc 6. The mixing blades 12 have a different design. They are designed as elongated walls having sharp end regions.

Figure 9:
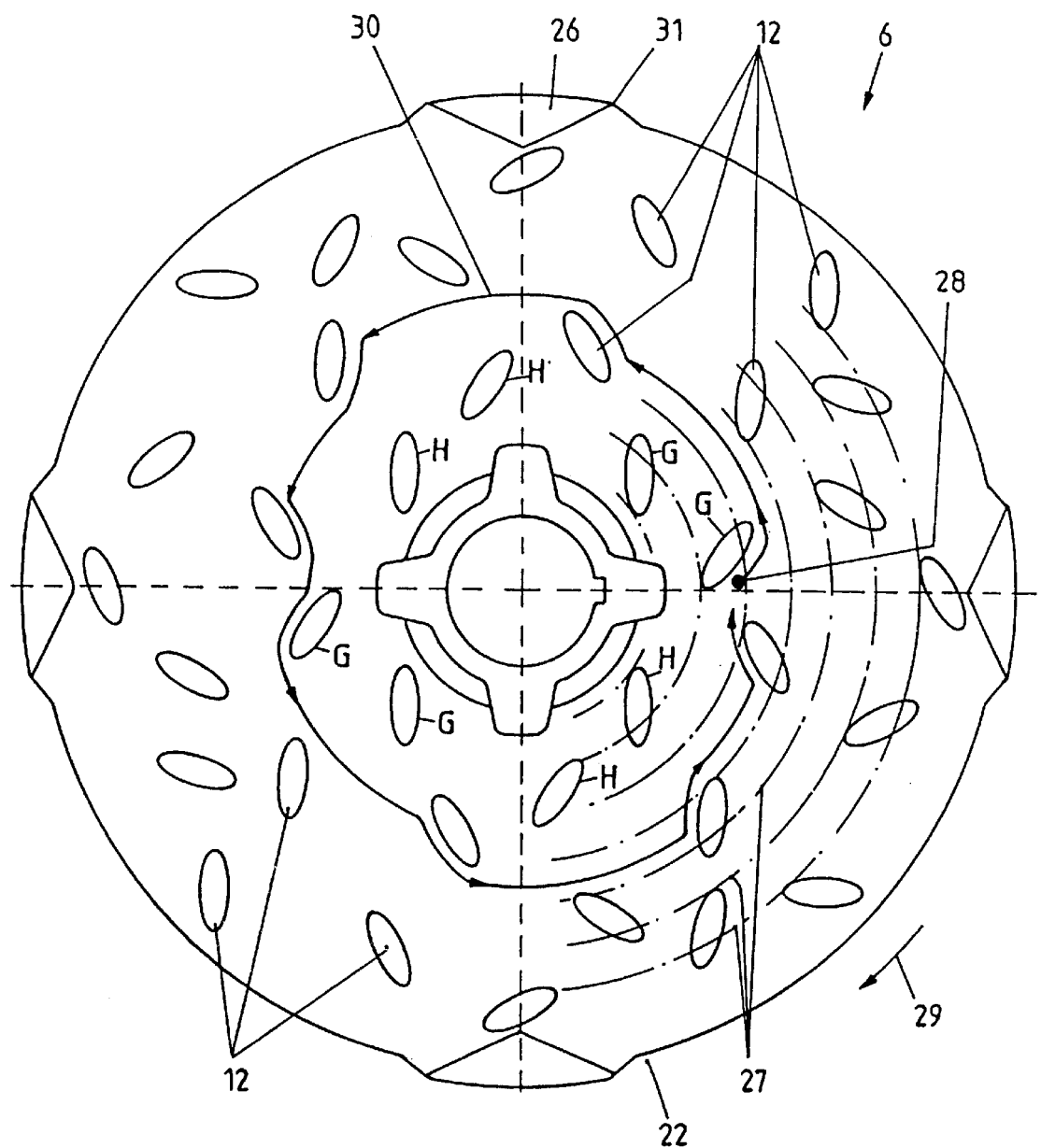
FIG. 9 illustrates another embodiment of the mixing disc.

The embodiment of the disc 6 as illustrated in FIG. 9 is similar to the embodiments as illustrated in FIGS. 4 and 5. A group of four mixing blades 12 is arranged on one annulus or circular ring 27. At least this is true in a radial inside portion of the disc 6. The number of mixing blades 12 about the circumference on one circular ring 27 is increased in a radial outside portion of the disc 6 since the velocity of the mass in this radial outside portion is less than the velocity of the mass in a radial inside portion.

Figure 10:
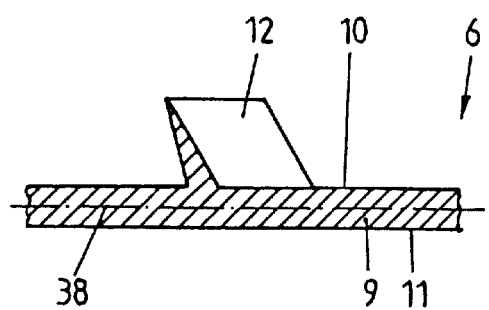
FIG. 10 illustrates a radial sectional view of the mixing disc showing one mixing blade.
Figure 11:
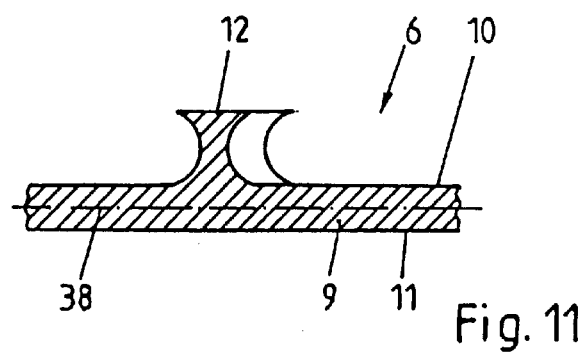
FIG. 11 illustrates a sectional view similar to FIG. 10 showing a mixing blade of a different design.
Figure 12:
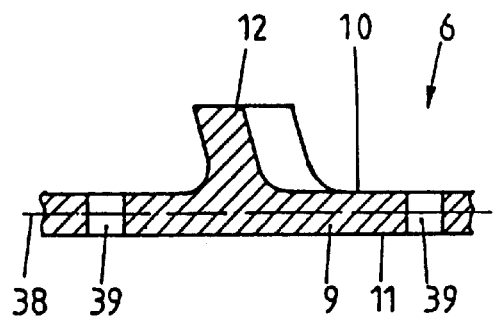
FIG. 12 illustrates another embodiment of the mixing blade being arranged at the mixing disc.

FIGS. 10 to 12 illustrate detailed cross sections of the mixing disc 6 with its body 9. Only one mixing blade 12 is illustrated on the top side 10 of the body 9 although another mixing blade 12 is arranged on the bottom side 11 of the mixing disc 6. The arrangement of the mixing blades 12 may be mirror symmetric to a middle plane 38. It can be seen from FIG. 10 that the mixing blade 12 may be arranged to be inclined to the top side 10 and to the middle plane 38, respectively, to improve the mixing effect. The mixing blade 12 may be designed to be sharp at its free end to have a positive influence on the taking off effect of the mass from the tempering surface 18.

FIG. 11 illustrates an embodiment in which the mixing blade 12 is designed to be rounded and plough-like such that the mass elements are turned and guided in a circular direction when the mass is contacted by the mixing blade 12.

FIG. 12 illustrates an embodiment of the mixing disc 6 in which the mixing blade 12 is arranged to be inclined with respect to the middle plane 38, but it has a relatively great contact surface at its free end. The body 9 of the disc 6 may include openings 39. The openings 39 serve to reduce the weight of the disc 6. It is not especially desired that a great percentage of the mass passes through the openings 39.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for continuously tempering chocolate masses, comprising:
 a plurality of tempering chambers including tempering surfaces and being interconnected for the flow of a tempering medium;
 a plurality of mass chambers, each of said mass chambers being arranged between said tempering surfaces of said tempering chambers, and said mass chambers being interconnected for the flow of the mass to be tempered;
 a plurality of driven mixing discs having a radius, a circumference, an outer diameter, an inner diameter, a top side and a bottom side, said mixing discs being arranged inside said mass chambers and including openings allowing for a passage of the mass to be tempered from said bottom side toward said top side;
 a majority of mixing blades being arranged on both the top sides and on the bottom sides of said mixing discs in groups on a plurality of circular rings in a spaced apart manner in a radial direction and in a circumferential direction of said mixing discs without continuous channels being formed between said mixing blades, said mixing blades having a length which is substantially less than the radius of said mixing discs, and said mixing blades being designed and arranged to take the mass to be tempered off said tempering surfaces and to mix the mass.

2. The apparatus of claim 1, wherein two different kinds of mixing blades are arranged both on the top sides and on the bottom sides of said mixing discs, the first kind of mixing blades having a mixing effect in a radial outside direction of said mixing discs, and the second kind of mixing blades having a mixing effect in a radial inside direction of said mixing discs.

3. The apparatus of claim 1, wherein a first mixing blade is arranged on one of the circular rings to have a mixing effect in an outward direction, and a second adjacent mixing blade is arranged on the same circular ring to have a mixing effect in an inward direction.

4. The apparatus of claim 1, wherein said mixing blades are arranged about the circumference of said mixing discs in an overlapping arrangement to completely take the mass to be tempered off said tempering surfaces during one rotation of said mixing discs.

5. The apparatus of claim 1, wherein said mixing blades are designed as mixing blades not providing a substantial conveying motion for the mass to be tempered.

6. The apparatus of claim 1, wherein said mixing blades are designed to be rectilinear, and they are arranged at an inclination angle with respect to the circumferential direction of the circular rings.

7. The apparatus of claim 1, wherein said mixing blades are arranged on the circular rings to be equally spaced apart about the circumference of said mixing discs.

8. The apparatus of claim 6, wherein the inclination angle of said mixing blades being arranged on a first circular ring is more than the inclination angle of said mixing blades being arranged on a second circular ring, the first circular ring being located radially further inside of said disc than the second circular ring.

9. The apparatus of claim 1, wherein said openings of said mixing discs allowing for a passage of the mass to be tempered from said bottom side toward said top side are arranged at the outer diameter of said mixing discs.

10. The apparatus of claim 9, wherein said openings of said mixing discs are arranged to extend about the entire circumference of said mixing discs.

11. The apparatus of claim 1, wherein said openings of said mixing discs allowing for a passage of the mass to be tempered from said bottom side toward said top side are arranged at the inner diameter of said mixing discs.

12. The apparatus of claim 1, wherein said mixing blades are designed and arranged to take the mass off said tempering surfaces and to mix the mass without getting in direct contact to said tempering surfaces.

13. The apparatus of claim 1, wherein said tempering chambers and said mass chambers are part of a tempering column.

14. An apparatus for continuously tempering chocolate masses, comprising:

a tempering column including:

a plurality of tempering chambers including tempering surfaces and being interconnected for the flow of a tempering medium;

a plurality of mass chambers being arranged between said tempering surfaces of said tempering chambers, and said mass chambers being interconnected for the flow of the mass to be tempered;

a plurality of driven mixing discs having a radius, a circumference, an outer diameter, an inner diameter, a top side and a bottom side, said mixing discs being arranged inside said mass chambers and including openings allowing for a passage of the mass to be tempered from said bottom side toward said top side;

a majority of mixing blades being arranged on both the top sides and on the bottom sides of said mixing discs in groups on a plurality of circular rings in a spaced apart manner in a radial direction and in a circumferential direction of said mixing discs without continuous channels being formed between said mixing blades, said mixing blades being designed and arranged to take the mass to be tempered off said tempering surfaces and to mix the mass, said mixing blades having a length which is substantially less than the radius of said mixing discs.

15. The apparatus of claim 14, wherein two different kinds of mixing blades are arranged both on the top sides and on the bottom sides of said mixing discs, the first kind of mixing blades having a mixing effect in a radial outside direction of said mixing discs, and the second kind of mixing blades having a mixing effect in a radial inside direction of said mixing discs.

* * * * *